Patented July 6, 1937

2,085,778

UNITED STATES PATENT OFFICE 2,085,778

ALKYD RESIN COMPOSITIONS

Herbert A. Winkelmann, Chicago, Ill., assignor to Marbon Corporation, a corporation of Delaware No Drawing. Application March 20, 1936, Serial No. 69,882

8 Claims. (Cl. 106—23)

This invention relates to an improvement in coating compositions.

It is an object of this invention to provide a coating composition which is highly resistant to acids, alkalis, and other corrosive materials.

It is a further object to provide a corrosion resistant lacquer or varnish which is firmly adherent to metal surfaces.

Other objects will become apparent from the following specification and appended claims.

Coating compositions in accordance with this invention will contain essentially rubber hydrochloride and an alkyd resin.

The rubber hydrochloride may be saturated or partially saturated, crystalline type or amorphous soluble, non-gelling type. The preferred rubber hydrochloride is a substantially saturated addition product of rubber and hydrogen chloride of the amorphous soluble, non-gelling type, having approximately 28 to 30% chlorine content. It may be made by reacting thin sheets of rubber with liquefied hydrogen chloride at —85° C. The rubber used in making rubber hydrochloride may be milled or unmilled, unvulcanized or partially vulcanized, smoked sheet, pale crepe, reclaim, scrap or equivalent rubbers such as gutta percha and balata. The preferred rubber is a milled pale crepe.

Various alkyd resins may be used in the composition. Alkyd resins as used in this specification and claims are compounds of phthalic or other polybasic acid with glycerine or other polyhydric alcohol, and include the modified types which, for example, contain fatty acids either saturated or unsaturated, or which contain natural resin acids or esters.

Various ingredients in addition to rubber hydrochloride and alkyd resins may be included in the compositions of this invention, as for example gums or resins as ester gums, chlorinated diphenyls, coumarone, phenol - formaldehyde condensation resins, polyvinyl esters, polystyrene, shellac, copal, etc., colors and pigments or fillers; heat stabilizers such as magnesium oxide, lead oxide; age resistors such as oximes, hexamethylene tetramine; plasticizers such as butyl stearate, dibutyl phthalate, chlorinated paraffin, oils such as tung oil, linseed oil, castor oil and other ingredients which may be desirable and which are compatible with the rubber hydrochloride and alkyd resin.

Any suitable solvent or solvent mixture may be used in the preparation of the fluid coating compositions of this invention. Benzol, ethylene dichloride, toluene, carbon tetrachloride, chloroform, xylene, dichlorodimethylether, hydrogenated naphthas, etc., may be used. The mixtures may be made by agitation alone or by milling of the materials without solvents followed by agitation with the solvents. It is preferred to mill the rubber hydrochloride since by this means the viscosity is greatly reduced. In the compounding of compositions in accordance with this invention the essential ingredients may be used in widely varying proportions and other ingredients which may be included may likewise be used in widely varying proportions. The amount and type of material, however, should be varied in accordance with the particular use of the coating compositions.

For general corrosion resistant coatings the rubber hydrochloride, for example, may be used in amount within say about 5 to 25%, while an alkyd resin may be included within say about 2 to 40%. The solvent may be used in any amount with consideration for the fluidity desired for the composition. Thus, for example, the solvent may be used in amount within say, the range 90–35% to give compositions which may be readily applied as by brushing, spraying, dipping or the like. Where crystalline rubber hydrochloride is used the solutions must generally be applied hot, as the crystalline rubber hydrochloride, which is the ordinary rubber hydrochloride made by passing hydrogen chloride into solutions of rubber, is soluble in cold benzol only to the order of about 1%, and even when heated the solutions of, for example, 10% are viscous and gel quickly on cooling, and in some instances simply on standing. For this reason ordinary or crystalline rubber hydrochloride is not preferred except where high turpentine resistance is essential. The amorphous, soluble non-gelling type is readily soluble in cold benzol to above 8%, and by milling there can be obtained 40% solutions in cold benzol, and even higher, which remain in their fluid state. It is, therefore, the preferred rubber hydrochloride of this invention. Its chief disadvantage is its low resistance to turpentine and its lesser resistance to certain oils when compared to rubber chlorides and ordinary crystalline rubber hydrochloride. Its greater inherent flexibility, its higher resistance to acids and its greater stability under temperature changes and light rays than rubber chloride give it an advantage over this material in lacquer while the greater solubility and non-gelling characteristics give it a marked advantage over ordinary rubber hydrochloride.

The alkyd resins as a class, combine with rubber hydrochloride to give a product having superior characteristics to either the rubber hydrochloride or the alkyd resins. The new compositions have superior adherence to metal, and increased resistance to water than straight rubber hydrochloride. The addition of alkyd resins also increases the resistance of amorphous rubber hydrochloride to turpentine, lubricating oils and the like. The use of rubber hydrochloride with the alkyd resins, on the other hand, gives a coating of superior flexibility and toughness.

Some of the resins which were most compatible with rubber hydrochloride and rubber hydrochloride solvents are the alkyd resins modified with monobasic acids. Among the alkyd resins which have been found useful are glycerol phthalate resin modified with natural resin acids such as rosin, copal, etc., glycerol phthalate resins modified with nondrying oils and acids such as stearic, oleic, castor oil, etc., glycerol phthalate resins modified with drying oils and acids such as linseed, tung, etc., glycerol phthalate resins modified with phthalides; four component type resins such as glycerol phthalate resins modified with drying oils and natural resin acids such as tung oil with rosin, glycerol phthalate resins modified with other synthetic resins and particularly by the phenol formaldehyde products. Other polyhydric alcohols than glycerol may be used, as for example glycol and pentaerythritol. Also other polybasic acids than phthalic acid or phthalic anhydride may be used. With rubber hydrochloride the use of aliphatic polybasic acids such as succinic, malic and maleic give some advantage as, for example, better age resistance.

The rosin maleic-glycerides with rubber hydrochloride give compositions of superior light fastness and clear light color.

An illustration of the practical adaption of this invention, for example, satisfactory composition for various uses may be made up on the following formulae:

| Rubber hydrochloride | 10 | 10 | 10 | 10 | 10 |
|---|---|---|---|---|---|
| Glycerol phthalate-rosin | 7.5 | 15 | | | |
| Glycerol phthalate-rosin-tung oil | | | 15 | | |
| Glycerol phthalate-tung oil | | | | 15 | 7.5 |
| Phenol-formaldehyde resin (Amberol 801) | 7.5 | | | | |
| Ester gum | | | | | 7.5 |
| Hydrogenated naphtha | 50 | 50 | 50 | 50 | 50 |
| Toluol | 50 | 50 | 50 | 50 | 50 |

The composition in accordance with the above formula and description will be found especially suitable where a corrosion resistant coating is desired. The compositions are extremely resistant to hydrochloric acid, sulfuric, caustic alkali, formaldehyde and hypochlorous acid. Good resistance to brine is another of their valuable properties, particularly true of the alkyd resins modified with drying oils.

The composition may be applied to various surfaces such as wood, metal, rubber and the like, by spraying, brushing, dipping, etc., and on evaporation of the volatile ingredients will form a coating having excellent adherence to the surface, of good appearance, flexibility, stability, etc., and a very high resistance to corrosion. The compositions are particularly adapted for obtaining a coating on metal surfaces such as pipes which are buried underground or exposed to acid fumes. The composition may also be applied to rubber surfaces but for this purpose a plasticizer such as dibutyl stearate, dibutyl phthalate, hydrogenated methyl abietate should be added.

The term amorphous rubber hydrochloride as used in the specification and appended claims refers to the physical structure of the rubber hydrochloride as determined by x-ray analysis. The amorphous rubber hydrochloride is also believed to be a symmetrical rubber hydrochloride. These rubber hydrochlorides are further characterized by being readily soluble in benzol at normal room temperature to above 5% and forming stable or non-gelling sols.

I claim:

1. A composition of matter comprising a rubber hydrochloride and an alkyd resin.

2. A coating composition comprising a rubber hydrochloride, an alkyd resin and a solvent.

3. A coating composition comprising a rubber hydrochloride, an alkyd resin modified with a monobasic acid, and a solvent.

4. A coating composition comprising amorphous rubber hydrochloride about 5–25% an alkyd resin about 2–35% and a solvent.

5. In combination a surface and a film containing rubber hydrochloride and an alkyd resin.

6. In combination a metal surface, and a film containing a rubber hydrochloride and an alkyd resin.

7. In combination a paper surface, and a transparent film containing a rubber hydrochloride and an alkyd resin.

8. In combination a rubber surface, and a film containing a rubber hydrochloride and an alkyd resin.

HERBERT A. WINKELMANN.